Figure 1:
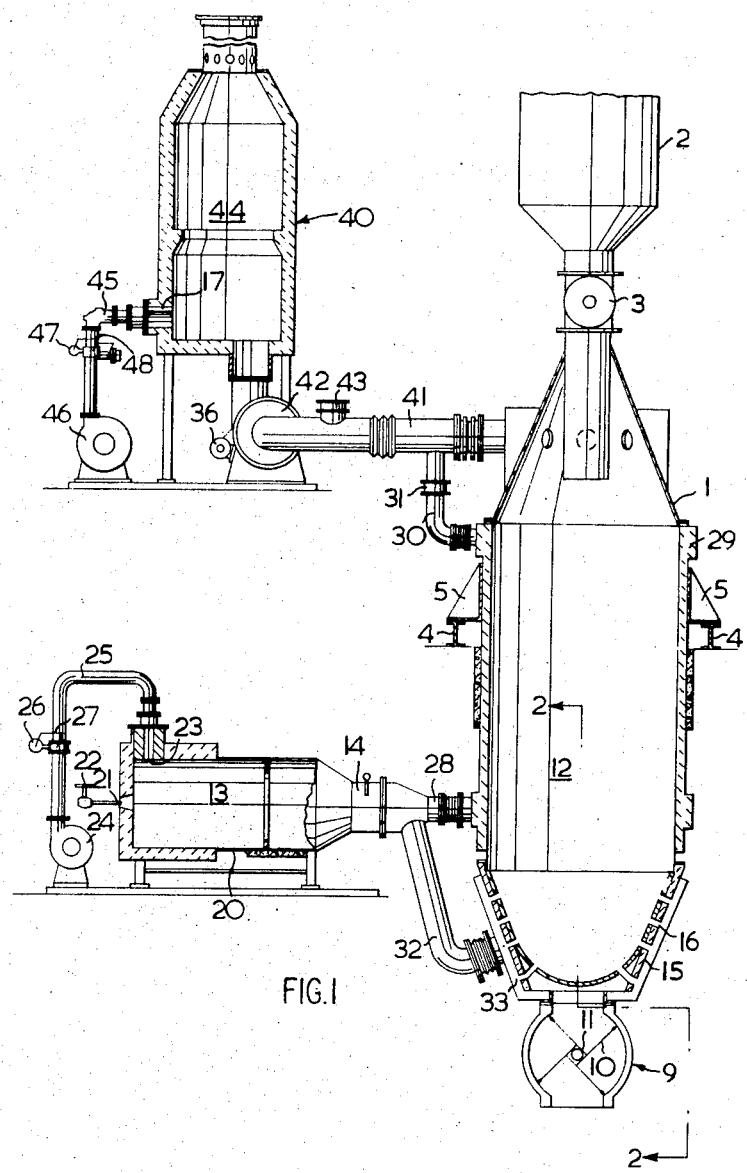

United States Patent [19]

Gravel

[11] 3,847,664
[45] Nov. 12, 1974

[54] FIBERGLASS RECLAIMING

[76] Inventor: Jean J. O. Gravel, 435 Norman St., Montreal, Quebec, Canada 645

[22] Filed: Mar. 22, 1973

[21] Appl. No.: 343,762

[52] U.S. Cl............................ 134/2, 65/65 R, 134/19
[51] Int. Cl........................ C03b 29/00, C03c 25/00
[58] Field of Search................. 65/65 R; 134/2, 19

[56] References Cited
UNITED STATES PATENTS

| | | | |
|---|---|---|---|
| 2,674,549 | 4/1954 | Balz | 134/2 |
| 2,666,720 | 1/1954 | Balz | 134/2 |
| 3,502,456 | 3/1970 | Fenter | 134/2 |

Primary Examiner—Robert L. Lindsay, Jr.
Attorney, Agent, or Firm—Browne, Beveridge, DeGrandi & Kline

[57] ABSTRACT

A process of removing organic binder material from the surface of randomly oriented glass fibers forming a bulk material, particularly glass fiber insulation material, in which a gaseous mixture containing oxygen and water varpor is passed through the material, from which the air has previously been removed from the interstices thereof, at a temperature sufficient to effect removal of the organic binder from the surfaces of the glass fibers by volatization including vapourization oxidation and gasification thereof, but below that at which incipient fusion of the glass fibers occurs, the temperature of the glass fibers being maintained in said range by proportioning the amounts of oxygen and water vapour in the gaseous mixture such that the heat generated by the exothermic oxidation reaction is at least partially and preferably substantially completely balanced by the endothermic gasification reaction.

8 Claims, 2 Drawing Figures

FIBERGLASS RECLAIMING

The present invention relates to a process of removing organic binder material from the surface of randomly oriented glass fibers forming a bulk material and particularly glass fiber insulation material.

In particular, the present invention relates to such a process in which the organic binder is substantially completely removed from the surface of the glass fibers without there being in the process, any softening or fusing of the glass fibers and any occlusions of carbon in the glass forming the fibers whereby the glass fibers may be reused per se in re-forming such glass fiber insulation material or melted and reformed into more suitable glass fibers which is particularly applicable to waste glass fiber insulation which has been trimmed from standard length.

Glass fiber insulation is conventionally manufactured by producing the glass fibers in bulk form by means of a blowing process. A certain amount of organic material e.g., phenolic resin is then added thereto as binder for the purpose of providing cohesive strength and other improved mechanical properties thereto. The amount of binder desired is determined inter alia by the method of application of the insulation material and for example may contain about 5 percent by weight of organic binder in blowing wool and up to 15 percent by weight of organic binder in pouring wool.

At the present time a substantial amount of glass fiber insulation material is wasted, such waste originating mostly in the manufacturing process from trimming of production size lengths and widths to sizes for marketing and also from off-specification glass fiber insulation material obtained in the normal course of manufacturing. Heretofore the disposal of the waste glass fiber insulation has presented a problem and a usual procedure is to remove the waste glass fiber insulation to land fill with the associated loss of the waste glass fiber insulation material together with the cost of its handling and burial.

In order for the waste glass fiber insulation material to be reused in the manufacture of useful glass fiber insulation material, it is necessary that the organic binding agent be removed from the surface of the glass fibers. The reclaimed glass fibers can be reused per se in forming insulation material. The reclaimed glass fibers may alternatively be melted to produce fresh fibers.

It is a critical feature of such a process, however, that the temperature during the process does not reach the incipient fusion temperature of the glass forming the fibers. Fusion of the glass may cause loss of important physical properties of the glass fibers such as fiber size and bulk density of the insulation which is important when the fibers are to be reused per se. Further, carbon formed by the decomposition of the organic binder in the process may become occluded in the surface of the fused glass forming the fiber which occlusions are unacceptable as they detract from the physical properties of the reclaimed product. Also, these carbon occlusions interfere with the melting process required to reuse the material by melting.

Attempts have been made to remove organic binder material from the surface of the glass fibers and these have generally fallen into two general methods, namely by treating the glass fiber materials with chemical solutions or by heating. Such processes are disclosed for example in the following U.S. patents. U.S. Pat. No. 2,633,428 issued to Klug; U.S. Pat. No. 2,845,364 issued to Waggoner; U.S. Pat. No. 2,970,934 issued to May; U.S. Pat. No. 3,375,155 issued to Adams; U.S. Pat. No. 3,382,135 issued to Adams; U.S. Pat. No. 2,674,549 issued to Balz; U.S. Pat. No. 3,012,845 issued to Lotz; U.S. Pat. No. 3,502,456 issued to Fetner; U.S. Pat. No. 3,253,897 issued to Falls; and U.S. Pat. No. 3,008,846 issued to Caroselle. The processes disclosed in these patents are all directed to the removal of organic binders from either threads or from the fibers in woven form e.g., in the form of fabrics which processes are generally unsuitable for the removal of organic binders from glass fiber insulation material which is a bulk material.

In particular, the processes set forth in Adams and Balz are chemical solution processes which processes when applied to the removal of organic binder material from glass fiber insulation material would detract substantially from the bulk density of the glass fiber insulation material and the so-treated glass fiber insulation material would subsequently require drying thereof which is expensive and difficult due to the thickness of the insulation material.

The processes of the other patents involve heating and combustion in furnaces of conventional design and have failed to provide a satisfactory process for the removal of organic binder from glass fiber insulation material in that the heat liberated by the combustion of the binder material causes the temperature to rise above the incipient fusion point of the glass forming the fibers and the product obtained is a frozen mass of glass of high density and of no value as an insulator and further some carbon material is locked in by the fused glass. Thus, Klug, Waggoner and May burn the organic binder on the surface of the glass fiber which processes while being suitable for the removal of the organic binder from threads and fabrics where the heat generated may be rapidly dissipated are unsuitable for removing organic binder from glass fiber in insulation material which has a substantial thickness and bulk and where the heat generated is difficult to dissipate and results in the temperature of the insulation material rapidly exceeding the incipient fusion temperature of the glass fibers and reaching for example in excess of 2,000°F. Botz discloses a process involving programmed heating of threads and fabrics with ample venting. In order to achieve satisfactory venting of the glass fibers, in the burning of the organic binder therefrom in a glass fiber insulation material very large quantities of gas have to be used to effect the necessary cooling of the fibers which commercially is impracticable.

Both Fetner and Falls use jets of air and exhaust gases to remove the organic binder from the glass threads and fabrics woven therefrom which process would be impracticable with bulk glass fiber insulation material. Caroselle uses inert, (oxygen-free) gas to remove organic binder from glass fabrics which process applied to glass fiber insulation would present substantial difficulties in controlling the temperature in the bulk material.

The present invention provides a process for the removal of an organic binder from the surface of randomly oriented glass fibers forming a bulk material particularly a glass fiber insulation material in which the temperature of the glass fibers is readily and simply maintained sufficient to substantially completely remove the organic binder from the surface of the fibers by gasification and oxidation and below that at which incipient fusion of the glass fibers in the bulk material occurs.

It has now been found in accordance with the present invention that by contacting the glass fibers of the bulk material, from the interstices of which material air has been previously removed, with a gaseous mixture containing water vapour and oxygen at a temperature sufficient to cause removal of the organic binder from the surface of the fibers by volatization including vapourization oxidation and gasification and below the incipient fusion temperature of the glass fibers, it is possible to balance the heat generated by the oxidation reaction due to the presence of oxygen against the heat absorbed by the gasification reaction due to the presence of water vapour by selecting appropriate relative proportions of the oxygen and water vapour in the gaseous mixture to maintain the temperature of the fibers in the aforesaid temperature interval.

According to the present invention therefore, there is provided a method of removing organic binder material from the surface of randomly oriented glass fibers forming a bulk material which method comprises removing air from the interstices in said bulk material and subsequent to the removal of said air, passing a gaseous mixture containing oxygen and water vapour through said bulk material so as to contact the surfaces of said glass fiber at a temperature at least sufficient to cause oxidation and gasification of the organic binder material and below the incipient fusion temperature of the glass fibers the relative proportions of water vapour and oxygen being selected to maintain the temperature in the aforesaid range.

It is a critical feature of the present invention that any free oxygen be substantially removed from the interstices of the bulk material before the temperature of the glass fibers forming said bulk material reaches a level sufficient to cause significant oxidation of the organic binder on the glass fiber. Without the removal of such oxygen, which is normally in the form of air and is present in the interstices of the glass fibers forming the bulk material, on reaching the oxidation temperature of the organic binder, the temperature of the glass fibers rises rapidly causing fusion of the glass fibers. The air in the interstices of the glass fibers forming the bulk material may be removed by purging with a gas which is non-reactive with the organic binder. In a particular embodiments of the present invention the air may be purged from the interstices of the bulk material with the gaseous mixture resulting from the combustion of fuel which has depleted the oxygen. The process of the present invention may be operated as a batch process or more preferably as a continuous process wherein the gaseous mixture containing oxygen and water vapour is passed counter-current to the movement of a bed formed of the bulk material in which case the product gases from the oxidation and gasification of the organic binder and which contain substantially no free oxygen are used to effect purging of the air from the interstices of the incoming bulk material to form the bed.

It is a further critical feature of the present invention that the temperature of the glass fibers must be at least sufficient for oxidation and gasification of the organic binder material to take place within a reasonable time interval and for example a time interval from 10 to 30 minutes. In order to achieve a substantially complete removal of the organic binder material from the surfaces of the glass fibers a minimum temperature of 800°F is desirable but it will be realized that when longer time intervals are tolerable lower temperatures for the glass fibers are utilizable. It is also critical that the temperature of the glass fiber should not reach the incipient fusion temperature of the glass forming the fibers which for most glasses used in forming glass fiber insulation is in the range 1,200°F to 1,400°F. It is achieved by selecting the concentration of oxygen in the gaseous mixture to at least partially and preferably substantially, completely balance the heat generated in the exothermic oxidation reaction with the heat absorbed in the endothermic gasification reaction. Preferably the selection of the proportions is such as to provide for a uniform temperature through the bulk material and to maintain the temperature of the glass fibers in the aforesaid temperature interval. The gaseous mixture suitably contains 1 to 4 percent by parts by weight of oxygen and 30 to 50 parts by weight of water vapour per 100 parts by weight of gaseous mixture the balance consisting primarily of carbon dioxide and nitrogen. It will be realized that the relative proportion of oxygen in the gas will depend upon the particular bulk material being treated, the particular temperature conditions desired in the bulk material and the gas flow rate used. These proportions may be adjusted experimentally to each condition.

The oxygen may be added to the gaseous mixture in elemental form but from economically practical considerations, it is added as air. In a particular embodiment of the present invention, the gaseous mixture is provided by burning a combustible gas, particularly natural gas, in a hot gas generator using a slight excess of air to provide the required oxygen content in the gaseous mixture (and also to provide the required temperature of the gaseous mixture sufficient to heat the bulk material to the desired temperature) and spraying water into the hot gas generator where it is vapourized to provide the water vapour and adjust the temperature of the gas/steam mixture in the range of 800°F to 1,200°F. The gaseous mixture may therefore contain, in addition to oxygen and water vapour, inert gaseous diluents such as nitrogen, and carbon dioxide which take little active part in the oxidation and gasification reactions. It will be readily seen that by selecting the concentration of oxygen in the gaseous mixture the heat generated by the oxidation reaction may, if desired, be substantially precisely balanced by the heat absorbed by the gasification reaction, while the temperature of the glass fibers in the bulk material for which the organic binder is being removed is determined mainly by the temperature of the gaseous mixture. The thickness of the bulk material through which the gaseous mixture passes is determined primarily by practical considerations and particularly by the back pressure which is desirable to cause uniform distribution of the gaseous mixture throughout the whole of the bulk material without any substantial channelling thereof. In particular, this distribution is determined by the ratio of the depth of the material to the width of the bulk material. Further, the bulk density of the bulk material must be such as to allow the gases to pass through the bulk material at a rate sufficient to provide residence time which allows for the removal of the organic binder in a reasonable time. The bulk density of the bulk material is suitably in the range of 2 to 5 pounds per cubic foot and preferably in the range 2.5 to 3 pounds per cubic foot which is the normal bulk density of uncompressed glass fiber insulation material. The rate of flow of gaseous mixture through the bulk material must again be sufficient to cause substantially complete removal of the organic binder from the surface of the glass fibers forming the bulk material in a reasonably practical time but not sufficient to lift and break up the bulk material. Suitably the rate of flow of the gaseous mixture through the bulk material is in the range of 20 to 50 pounds per hour per square foot of bulk material area.

The exhaust gases containing the gasified binder are suitably passed to a furnace to burn the organic binder material and thus avoid pollution of the atmosphere.

The present invention will be further illustrated by way of the accompanying drawings in which:-

Figure 2:
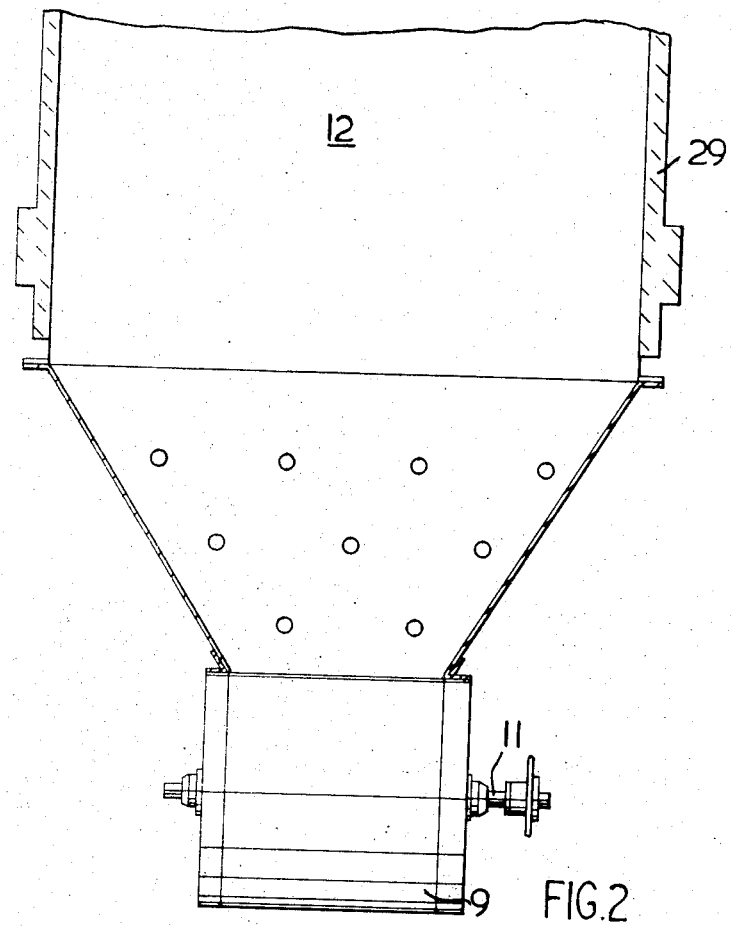

FIG. 1 is a vertical sectional view of apparatus for use in the process of removing organic binder from glass fiber insulation material according to one embodiment of the present invention; and FIG. 2 is a section taken along line 2—2 in FIG. 1.

The apparatus comprises a reclaiming reactor 1 provided with a hopper 2 through which waste glass fiber insulation material is fed to the chamber 12 of the reactor 1 via feeder valve 3 and passes downwardly through the chamber 12. The reactor 1 is supported in position on I-beams 4 by brackets 5. The glass fiber insulation from which the organic binder has been removed passes out of the chamber 12 through a rotary valve 9 including paddles 10 mounted on shaft 11 driven by an electric motor (not shown).

A hot gaseous mixture of water vapour, oxygen, and non-reactive gaseous diluents such as nitrogen and carbon dioxide is continuously produced in the hot gas generator 20. The chamber 13 of the furnace 20 is heated by a burner using a mixture of natural gas and air through a nozzle to a burner 23 and spraying water into the flame in the chamber 13 through the spray head 21. The supply of water to the spray head 21 is controlled by the metering valve 22. Air is fed to the burner 23 from air blower 24 via conduit 25 and gas is fed to the burner 23 from a source (not shown) through conduit 26 and conduit 25. The size of the flame issuing from the burner 23 and thus the heat release rate in the chamber 13 of the furnace 20 is controlled by a gang valve 27 in the conduits 26 and 25. The proportion of oxygen in the gaseous mixture is controlled by metering valves (not shown) in the conduit 26 upstream of the gang valve 27 which controls the rate of flow of natural gas to the burner 23.

The hot gaseous mixture generated in the chamber 13 of the furnace 20 passes therefrom to a manifold chamber 14 from whence a portion thereof passes through conduit 28 to a heating jacket 29 around the exterior of the reactor 1 which establishes the temperature in the chamber 12 of the reactor 1. The cooled gas exits from the jacket 29 through bypass conduit 30 provided with a control valve 31. The remaining portion of the gaseous mixture enters the base of the chamber 12 through the conduit 32 and distribution jacket 33 on the bottom cone of the reactor 1 and passes through the perforations 16 in the cone 15. The hot gaseous mixture then passes upwardly through the glass fiber insulation which is passing downwardly through the furnace chamber 12 causing the organic binder to be removed from the surface of the glass fiber material by oxidation and gasification. The proportion of the oxygen in the gaseous mixture passing upwardly through the glass fiber material in the furnace chamber 12 substantially uniformly across its width, is such that the glass fiber material has a substantially uniform temperature throughout its width which is substantially that of the gaseous mixture in the jacket 29.

As the exhaust gases containing no more oxygen and the products of gasification of the organic binder move upwardly through the chamber 12 of the reactor 1 they proceed to purge the air contained in the interstices of the fiber glass insulation in the upper portion of the chamber 12. The mixture of exhaust gases and the purged air then passes via conduit 41 under the action of blower 42 driven by a motor 36 to the bottom of an afterburner 40. The fan 42 also withdraws cooled gaseous mixture from the jacket 29 through bypass conduit 30 and also fresh air through flap valve 43. In the chamber 44 of the afterburner 40, the gaseous mixture entering through the conduit 41 is burned by a flame from a burner 17 fed with air through line 45 by means of a blower 46 and natural gas through line 47 and line 46. The size of the flame and thus the temperature in the chamber 44 of the afterburner 40 is controlled by a gang valve 48 in line 45 and 47. Control of the afterburner is based on the temperature within the chamber 44. The temperature in the chamber 44 will be set by a temperature controller acting upon the gang valve 48 at for example 1,600°F but due to the amount of organic material in the furnace effluent the temperature may go up above this for example up to 1,800°F even with the burner 40 at low fire. The fan 42 controls the actual flow of gaseous mixture to the afterburner which is a combination of the effluent from the reactor 1 plus fresh air drawn through valve 43 to provide the oxygen needed for oxidation of the organic material in the flow.

The gas flow out of the reactor 1 for a predetermined input rate of glass fiber insulating material is controlled by setting gang valve 27 on hot gas generator 20. The outlet temperature of the hot gas generator 20 is established by a temperature controller (not shown) which sets the water flow rate to the header 21 by operating upon the metering valve 22. The amount of oxygen in the gaseous mixture exiting from the hot gas generator 20 is adjusted by setting the relationship between the air and gas values of the gang valve 27.

The present invention will be illustrated by way of the following example.

EXAMPLE

In the operation of the apparatus of the accompanying drawing glass fiber insulation coated with 10 percent by weight of phenolic resin as organic binder is fed to the chamber 12 of the reactor 1 at a rate of 2,500 pounds per hour, the glass fiber insulation having a bulk density of from 2 ½ to 3 pounds per cubic foot. The reactor 1 has an overall height of 20 feet and a rectangular cross-section 5 feet 9 inches × 8 feet 2 ¼ inches and an effective volume of 500 cubic feet. The residence time of the glass fiber insulation in the chamber 12 is 26 minutes and during its passage through the chamber it is contacted with a hot gas mixture at a temperature of 1,000°F which is passed upwardly therethrough and also through the jacket 29 at the rate of 1,450 pounds per hour. The hot gas which consists of 40 percent by weight of water vapour and 9 percent by weight of carbon dioxide, 49 to 50 percent by weight nitrogen and 1 to 2 percent by weight oxygen is produced in the hot gas generator 20, the nozzle 23 being fed with natural gas at a rate of 1,500 cubic feet per hour and water being sprayed into the chamber 13 at a rate of 350 pounds per hour. Air is fed to the nozzle 23 from a fan 24. The exhaust gases from the chamber 12 exit through the conduit 41 at a temperature of 450°F at a rate of 1,750 pounds per hour and the input flow of gases through the conduit 41 to the chamber 44 was 4,700 pounds per hour. The natural gas flow to burner 17 is 400 cubic feet per hour and air is fed thereto by air blower 46. The temperature in the chamber 44 of the afterburner 40 is 1,600° to 1,800°F. The bulk glass fibers exiting through the rotary valve 9 are found to be essentially completely free of organic binder and to be physically unchanged.

The embodiments of the invention in which an exclusive property or privilege is claimed are defined as follows:

1. A method of removing organic binder material from the surface of randomly oriented glass fibers forming a bulk material which method comprises removing oxygen from the interstices of said bulk material and passing a gaseous mixture containing oxygen and water vapour through said bulk material so as to contact the surfaces of said glass fibers at a temperature in the range of 800°F to 1,200°F which is at least sufficient to cause oxidation and gasification of the organic binder material which temperature is below the incipient fusion of the glass fibers; said gaseous mixture being prepared by injecting a water spray into the flame of gas burning furnace, said gaseous mixture also including gases which are non-reactive with said binder; the relative proportions of water vapour and oxygen in said gaseous mixture being selected to maintain said temperature in the aforesaid range, said gaseous mixture containing 1 to 4 percent by weight of oxygen and 30 to 50 percent by weight of water vapour.

2. A method as claimed in claim 1 in which the bulk material is glass fiber insulation material.

3. A method as claimed in claim 2 in which the bulk density of the glass fiber insulation material is from 2 to 5 pounds per cubic foot.

4. A method as claimed in claim 2 in which the bulk density of the glass fiber insulation material is from 2.5 to 3 pounds per cubic foot.

5. A method as claimed in claim 2 in which the gaseous mixture is passed through the glass fiber insulating material at a rate of 20 to 50 pounds per square foot of section across the flow of gas.

6. A method as claimed in claim 1 in which the oxygen is removed from the interstices of the bulk material by purging prior to passing the gaseous mixture through the bulk material.

7. A method as claimed in claim 6 in which the oxygen is purged with said gaseous mixture at a temperature below that at which gasification and oxidation of the organic binder takes place to a significant extent.

8. A method as claimed in claim 7 in which is operated on a continuous basis the effluent gases from the oxidation and gasification of the organic binder being used to purge the oxygen from fresh feed of bulk material.

* * * * *